March 5, 1963 W. G. FORMAN 3,079,972
TIRE SNOW CLEAT
Filed June 15, 1962 2 Sheets-Sheet 1
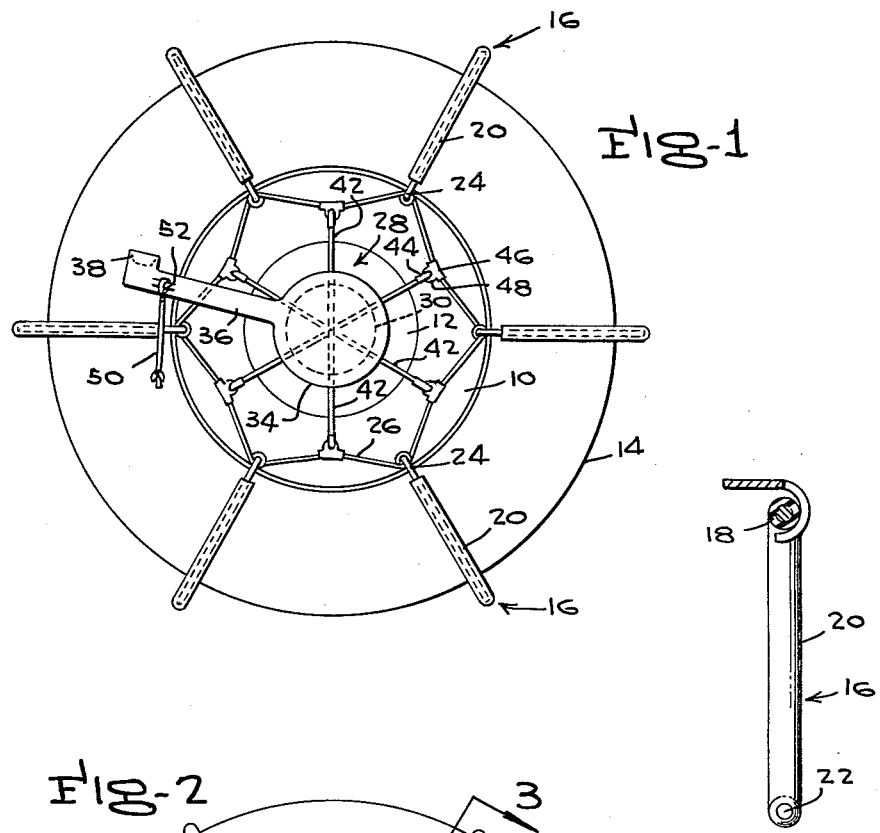
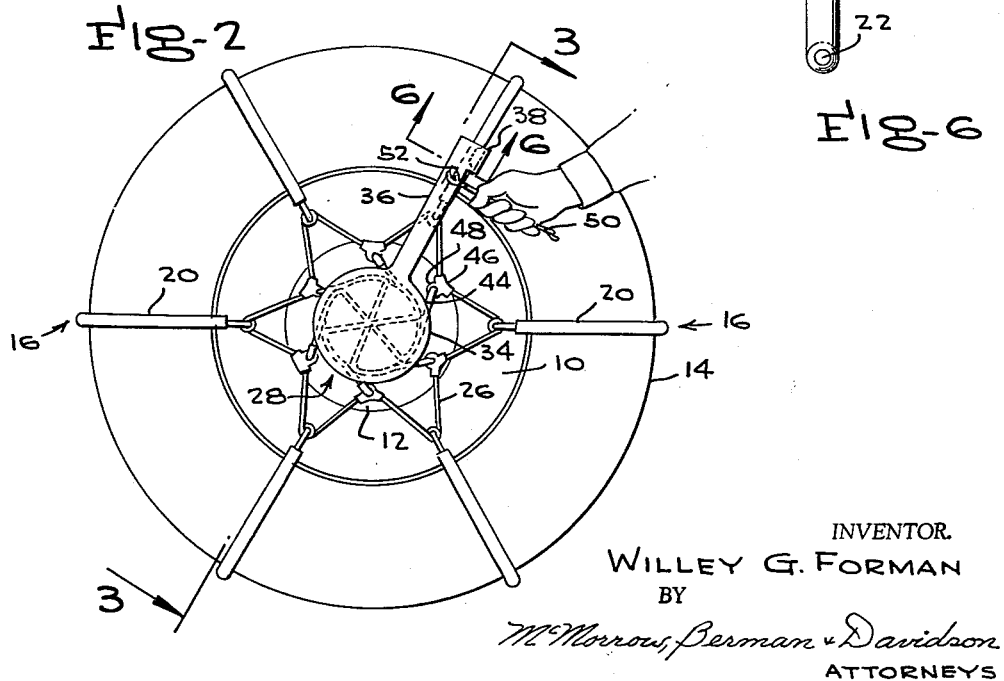
INVENTOR.
WILLEY G. FORMAN
BY
McMorrow, Berman & Davidson
ATTORNEYS March 5, 1963 W. G. FORMAN 3,079,972
TIRE SNOW CLEAT
Filed June 15, 1962 2 Sheets-Sheet 2
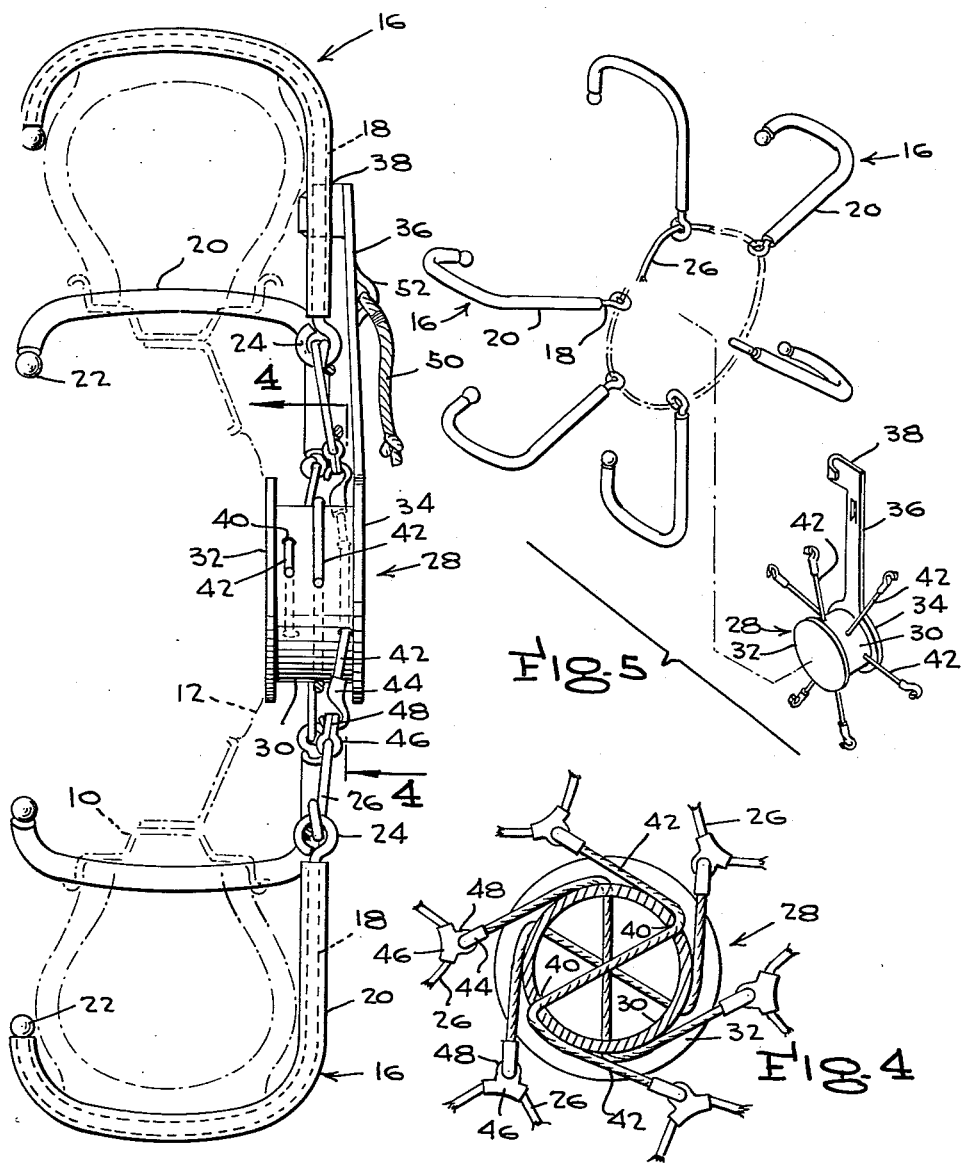
INVENTOR.
WILLEY G. FORMAN
BY
McMorrow, Berman & Davidson
ATTORNEYS

3,079,972
TIRE SNOW CLEAT
Willey G. Forman, Lawn Lane, Upper Brookville,
Oyster Bay, N.Y.
Filed June 15, 1962, Ser. No. 202,876
3 Claims. (Cl. 152—213)

This invention relates to a traction device, for ready and quick attachment to vehicle wheels, and in particular to a system of anti-skid cleats which may be mounted on a wheel without the need for jacking up the wheel or other laborious preparatory measures, and which may be tightened, when so mounted.

It is, therefore, a general object of the invention to provide a cleat system for wheels which has improved characteristics in respect to speed and ease of attachment.

More particularly, it is an object to provide a series of hook-form cleats assembled on a cable, in combination with a multiple winch device having a plurality of tension members arranged to exert radial pull on the cable at points intermediate the cleats. A further and related object is to provide an operating lever on the winch, with hook means cooperating with the cleats to hold the winch in tensioning adjustment. Yet another object is to provide an integrated cleat system, in which stresses are fully distributed, around the system.

These and other ends, which will be apparent, are attained by the present invention, a preferred form of which is described in the following specification, as illustrated in the drawings, in which:

FIGURE 1 is a side elevational view of a vehicle wheel, with the cleat system in place, prior to tightening, FIGURE 2 is a view similar to FIGURE 1, showing the cleat-holding means tightened, and the locking means therefor applied, FIGURE 3 is an enlarged sectional view through the wheel axis, taken on the line 3—3 of FIGURE 2, and showing the wheel in broken lines, FIGURE 4 is an enlarged sectional view through the winding drum, taken on the line 4—4 of FIGURE 3, FIGURE 5 is an exploded view of the two main parts of the cleat system, in perspective, and FIGURE 6 is an enlarged sectional view through the tensioning and locking lever, as taken on the line 6—6 of FIGURE 2.

Referring to the drawings by characters of reference, there is shown a vehicle wheel 10, with hubcap 12, and pneumatic tire 14, on which the cleats 16, six in number in the example shown, are mounted. The cleats comprise hook-form rods 18, contoured to mate with the lateral crown of the tire tread, and preferably covered by a tubular sleeve 20 of tough, rubbery material, such as tread stock to permit running on hard surfaces, without undue wear or other damage to the cleats. For retention of the sleeve, the cleat has a headed, terminal end 22 on a relatively short leg which engages around the inner side of the tire. On the outside of the tire the cleat has a longer leg with an eye-hook 24 on its radially inner end, by means of which it is grasped for application of radially inwardly directed, clamping forces, as will be set forth hereinafter.

Through the eyes 24, the cleats are strung on endless cable 26, which is of sufficient length when in a state of free play, as to enable the cleat hooks to be slipped over the tire, after which the tightening action is effected by take-up in the cable. To withstand localized, high stresses, the cable 26 is preferably looped at least once around each eye 24, and if desired, this loop may be made permanent, by any suitable means, or may be replaced by an eyelet affixed to the cable, or a ring hung loosely thereon.

The tightening action on the cable is applied by tension forces acting at points intermediate adjacent pairs of cleats, and directed generally radially inward toward the wheel axis, and to this end there is provided a winding drum 28, which is freely suspended in the cleat system when mounted, and has no interconnection with the wheel. As best seen in FIGURES 3 and 4, the drum or spool 28 has a central, cylindrical, working portion 30, and a pair of end flanges 32, 34, the latter having a radially extending arm 36, for applying leverage, to turn the drum, and the arm having a hook portion 38 on its inner side, at its outer end, adapted to engage behind one of the cleats, to hold the system in tightened condition.

The working portion 30 of the drum, which is preferably hollow, has a series of three pairs of diametrically opposite bores 40, angularly spaced in intervals of 120°, and arranged in spaced relation along its length, and threaded through each pair is a length of cable 42, carrying at each end a suitably attached hook 44, of sturdy construction, for engagement with the cable system 26. While these hooks may be engaged directly over the cable 26, it is preferable, in the interest of minimizing acute stresses to provide a connector element on the cable, and in the embodiment shown, this consists of an arcuate sleeve 46, with an eye-loop 48 extending from its convex side. As shown in FIGURE 3, this member may be of split construction, crimped on the cable, or the sleeve may be solid, and threaded onto the cable at the time of stringing the cleats thereon.

The simple, mounting operation involves merely draping the cleats 16 over the tire, as permitted by the slack in cable 26, positioning the cleats at stations roughly 60° apart, or at whatever other interval is called for by the number of cleats employed. Thereafter, it is only necessary to engage each pair of hooks 44 in oppositely disposed pairs of loops 48 of the connectors, rotate the drum 28 by manual force on lever arm 36, and engage the lever hook 38 around one of the cleats 16. As seen in FIGURE 3, the hook 38 is so located as to find clearance between the cleat and the inwardly tapering side wall of the tire.

A noteworthy feature of the invention resides in the fact that the tightening forces are not applied to the cleats separately, but to a system in the form of a closed loop, wherein any tendency toward an undue build-up of acute stresses, whether occurring in the tightening operation, or in response to traction effort, are automatically distributed throughout the system, in a process of constant adjustment. Also, the locking system for the winch combines the added function of a lever arm therefor, which not only makes for quick, easy action, but also does away with the need for expensive and complex, mechanical elements. In aid of the lever action, as well as locking, the arm 36 may be provided with a short length of pull rope or cable, 50, looped around an arch 52, struck outwardly from arm 36.

Removal of the system is equally simple, involving merely the unhooking of arm 36, after which the cleats may be lifted off the tire, with or without prior disengagement of the hooks 44.

While a certain, preferred embodiment has been shown and described, various modifications will be apparent, in the light of this disclosure and the invention should not, therefore, be deemed as limited, except insofar as shall appear from the spirit and scope of the appended claims.

I claim:

1. A traction system for vehicle wheels comprising:
   (a) a plurality of generally hook form cleats of a dimension such that they are engageable about a vehicle wheel fro mone side;
   (b) each of the cleats having loop means at one end thereof;

(c) an endless, flexible, tension cable threaded through the loop means of each cleat, the cable being of a length to permit mounting of the cleats on the wheel;
(d) a winding drum having inner and outer ends;
(e) a plurality of flexible drum cables, each having an outer end, and being secured to the drum;
(f) hook means on the outer end of each drum cable engaged with the tension cable at positions between the cleats;
(g) an outwardly extending winding arm extending from the outer end of the drum; and
(h) hook means on the winding arm for engagement with any selected one of the cleats for locking the drum in a selected location.

2. A traction system for vehicle wheels comprising:
(a) a plurality of substantially hook form cleats engageable about a vehicle wheel;
(b) a flexible tension cable of a length to permit mounting of the cleats on the wheel connected to each of the cleats, with the cleats in spaced apart relation;
(c) a winding drum;
(d) a plurality of flexible drum cables secured to the drum;
(e) the drum cables being secured to the tension cable at positions between the cleats;
(f) means for rotating the drums to wind the drum cables thereabout whereby the tension cable is drawn inwardly between the cleats to lock same in place on the wheel; and
(g) hook means operatively associated with the drum to maintain the drum in the rotated position.

3. A traction system for vehicle wheels, the traction system comprising:
(a) a plurality of generally hook form cleats of a dimension such that they are engageable about a vehicle wheel from one side;
(b) each of said cleats having loop means at one end thereof;
(c) an endless, flexible, tension cable threaded through the loop means of each cleat, the cable being of a length to permit mounting of the cleats on the wheels;
(d) a winding drum having inner and outer ends and having a series of pairs of diametrically opposite openings formed therein;
(e) a plurality of flexible drum cables extending through said openings in said drum, the cables having outer ends;
(f) hook means on the outer ends of each drum cable engaged with the tension cable at positions between the cleats;
(g) an outwardly extending wind arm extending from the outer end of the drum; and
(h) hook means on the winding arm for engagement with any selected one of the cleats for locking the drum in a selected location.

References Cited in the file of this patent
UNITED STATES PATENTS

| | | |
|---|---|---|
| 1,822,748 | Rivers et al. | Sept. 8, 1931 |
| 2,188,120 | Smith | Jan. 23, 1940 |
| 2,423,759 | Edwards | July 8, 1947 |
| 2,598,298 | Pindjak | May 27, 1952 |